United States Patent [19]
Bliss et al.

[11] Patent Number: 5,596,352
[45] Date of Patent: Jan. 21, 1997

[54] PRINTING APPARATUS AND METHOD FOR PRINTING COLOR BOUNDARY REGIONS HAVING REDUCED COLOR BLEED

[75] Inventors: Anitta L. Bliss, San Jose; Stuart L. Claassen, Santa Clara, both of Calif.

[73] Assignee: Apple Computer, Inc., Cupertino, Calif.

[21] Appl. No.: 126,072

[22] Filed: Sep. 23, 1993

[51] Int. Cl.⁶ .................................................. B41J 2/205
[52] U.S. Cl. ................................ 347/15; 347/41; 358/298
[58] Field of Search ................................. 347/5, 15, 40, 347/41, 43; 358/298, 502, 518, 523, 531, 525, 532, 534

[56] References Cited

U.S. PATENT DOCUMENTS

| | | | |
|---|---|---|---|
| 4,721,401 | 1/1988 | Malcolm . | |
| 5,012,257 | 4/1991 | Lowe et al. | 347/43 |
| 5,031,034 | 7/1991 | Shimizu et al. | 358/259 X |
| 5,070,413 | 12/1991 | Sullivan et al. | 358/543 |
| 5,315,382 | 5/1994 | Tanioka | 358/523 |
| 5,428,377 | 6/1995 | Stoffel et al. | 347/15 |

FOREIGN PATENT DOCUMENTS 1-264852  10/1989  Japan ........................................ 347/43

*Primary Examiner*—John E. Barlow, Jr.
*Attorney, Agent, or Firm*—Blakely, Sokoloff, Taylor & Zafman

[57] ABSTRACT

A printer and a method for printing is described in which bleed between secondary color regions having different colors is minimized by the formation of a border strip which has a color which is common to both secondary color regions. In a printer assembly which includes a print head for depositing ink onto a media, an improved image may be formed by processing the data before the image is printed such that a border strip is formed between adjoining regions of different secondary colors. The border strip is printed in a color which is common to both of the secondary color regions. Thus, because the color which is common to both secondary color regions is printed in the border region, the contrast between the three areas of different colors is minimized. In addition, the reduced volume of ink within the border strip further minimized ink bleed. Thus, a border strip which is significantly less visible to the naked eye, is formed which minimizes bleed between the two secondary color regions.

17 Claims, 8 Drawing Sheets

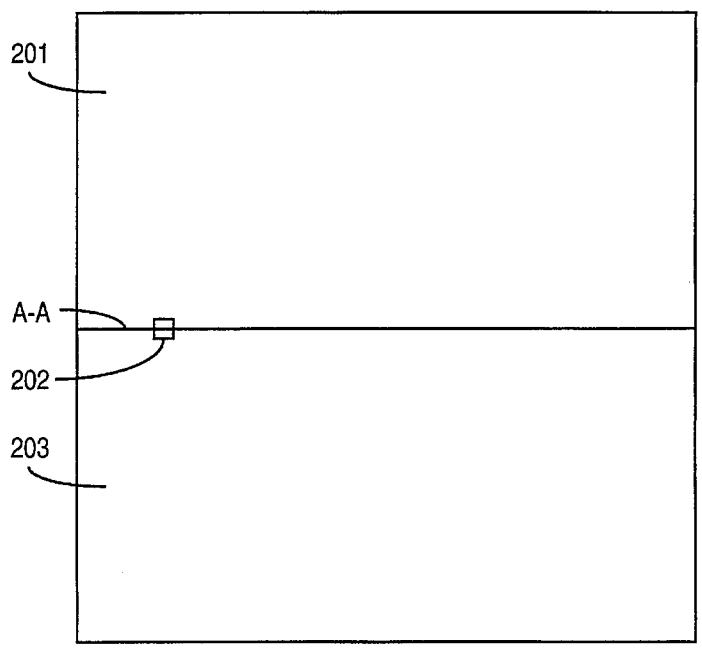
Fig. 2
Fig. 3
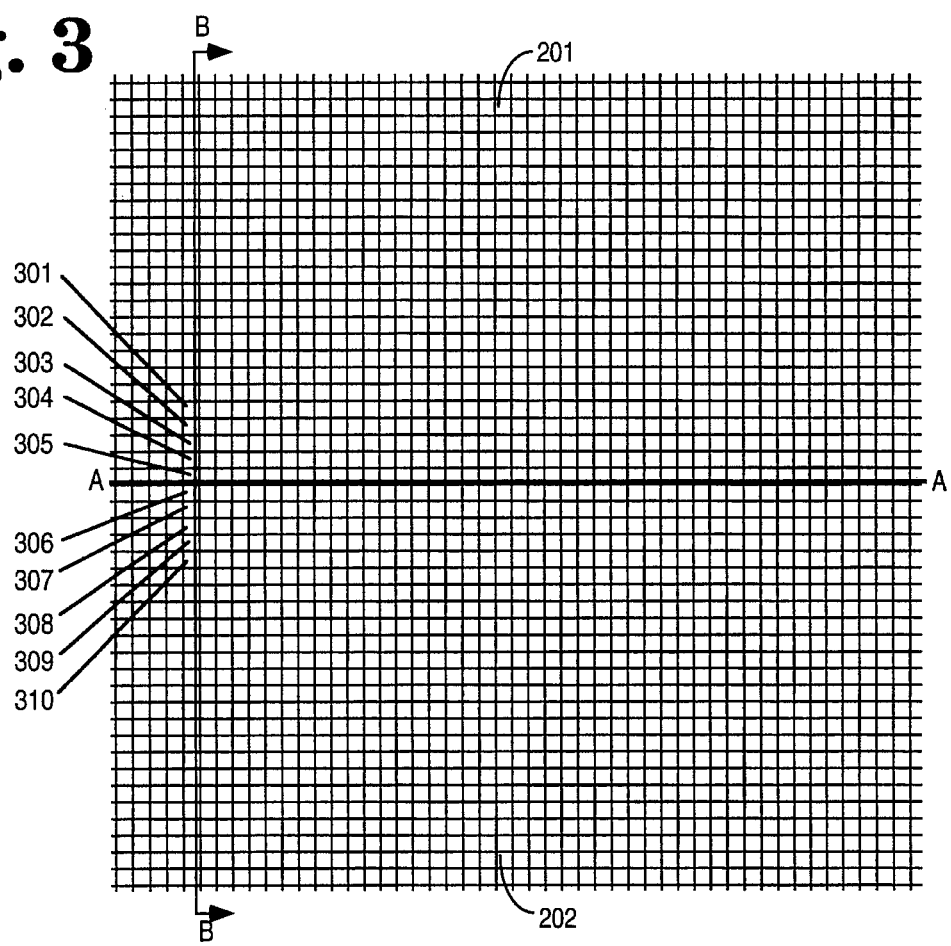

Fig. 9

PRINTING APPARATUS AND METHOD FOR PRINTING COLOR BOUNDARY REGIONS HAVING REDUCED COLOR BLEED

BACKGROUND OF THE INVENTION (1) Field of the Invention

The present invention relates to the field of printer assemblies, and more particularly, to an ink jet printer and a method for printing an image having reduced color bleed when printed on common use paper.

(2) Prior Art

Scan-type printer assemblies typically print color images by directly injecting onto a piece of paper the colors that form an image. The image is made up of a number of discrete points which are known as "pixels." In a color image each of the pixels has a color. The color image is rendered into device pixels by either the host computer or the printer controller using various halftoning techniques. The resulting image is made up of pixels at the resolution of the ink jet printer, where each of these pixels represents an individual dot of ink to be projected onto the surface of the paper. The methods for rendering an image are well known in the art. In a typical ink jet printer, a print head ejects ink dots onto the surface of the paper in those locations which correspond to the individual pixels of the color image. A print head typically accesses the different regions of the paper surface by means of moving the sheet of paper by use of a plurality of rollers which are powered by a motor drive. The print head moves across the page by means of a print head drive system. In these prior art printers, the print head typically prints the image exactly as it is relayed to the print head. In other words, the printed image exactly corresponds to the pixel image that was rendered at the device resolution.

A major problem with prior art printers using common paper and printing methods is the fact that colors tend to bleed together at boundaries between regions having different colors.

Bleed between different color regions can be quite severe. The bleed can produce altered color as far within the solid color region as fifty or more pixels (or dots) from the boundary. This problem is particularly acute with the respect to boundaries between two colored regions when both of those colored regions are secondary colors. Prior art methods for eliminating the color bleed problem have included the use of coated paper. Coated paper is undesirable as it is more expensive than so called plain paper. Furthermore, the use of coated paper does not always entirely eliminate the color bleed problem. One way to minimize bleed is to process the print signal which represents the image to be printed so as to produce an altered print image. Prior art techniques for altering print images for reducing color bleed have typically involved the elimination of a row or more of ink dots (or pixels) at the boundary between the two different colored regions. This often produces a white area between the two different regions The problem with this prior art method is the fact that the white area, which is often a line, is visible to the naked eye. Thus, an inferior quality image is produced.

What is needed is an apparatus and method for printing which will allow for reduced bleed between boundary regions, particularly those boundary regions which separate two regions having colors which are secondary colors. This apparatus and method should allow for the use of plain paper and should give a high quality image.

SUMMARY OF THE INVENTION

An apparatus and method for printing an image having reduced bleed between secondary color regions is described. Secondary colors are generally formed in an ink jet printing apparatus by the deposition of more than one unit of ink onto a particular location on the paper. This creates an ink dot containing a given volume of ink from two different ink reservoirs.

Bleed is the phenomena of one color flowing into the next coloring creating a dark band of unwanted color at the boundary between the different colors. Color printers preferably use cyan, magenta, yellow and black inks, which are often referred to as colorants; these colorants, are the primary colors of the color printer. To make secondary colors such as red, green and blue, two primary colors are mixed. Each secondary color in the case of a color printer is produced by a combination of two of the primary colors of the printer. Red is made from magenta and yellow, green from cyan and yellow, and blue from magenta and cyan. The worst bleed typically occurs at the boundaries between different secondary colors. Though primary colors can also bleed together, secondary colors can bleed more than twice as much as primary colors. Bleed may extend up to 0.05 inches from the boundary between the two secondary colors. The increased bleed of secondary colors as opposed to that between primary colors and between one primary color and a secondary color is primarily due to the fact that the volume of ink deposited onto any given pixel of a secondary color is greater than that which would be deposited on a pixel of a primary color. This is due to the fact that two volumes of ink muse be ejected onto the print media to produce a dot of a secondary color. By minimizing secondary bleed, the image quality improves greatly.

In every juxtaposition of two secondary colors there is a common primary color. For example, in a red and green interface, both colors have yellow in common. The present invention alters the image to be printed by processing the image such that a band of the common primary color is printed between the two secondary color regions. For example, when there is a region of green ink to be printed directly adjoining a red ink region, a yellow band would be printed between the green ink region and the red ink region. The present invention allows the common primary color to merge with the secondary colors adjoining the common primary color, but places "n" number of pixels composed of the common primary color between the two juxtaposed secondary colors. "n" can be any number of pixels, but a two pixel gap has been shown to be adequate when printing on commonly available copy paper, a form of "plain paper."

This technique allows the common primary color to bleed together with each of the secondary colors, but since both secondary colors contain the common primary color, there may be mixing of colors, but there is not a bleed problem. In most bleed situations the two dissimilar secondary colors bleed together to create black or brown. By creating a gap between the dissimilar secondary colors having a reduced volume of ink per dot (since only a single common primary color is applied to the paper at the boundary), the colors move toward each other but do not have enough ink to blend on top of each other. The edge created by this technique is much better than produced by placing blank pixels between the two secondary colored regions. In the prior art technique which creates the white edge between the two colors, the reason that the white gap is noticeable is because the contrast difference between the white paper and the secondary color is large. The human eye is highly sensitive to contrast variations. By filling in the gap with a common color, contrast is reduced, thereby making the gap less obvious to the human eye. In addition, the colors are able to blend together without overlapping, and without creating a section which has a black or brown color.

Of the objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings and in which like numbers indicate similar elements and in which:

FIG. 2 is a top view of a printed sheet having a boundary between two regions having different secondary colors;

FIG. 3 is an expanded view of a portion of the printed sheet of FIG. 2;

FIG. 9 is a diagram illustrating rows and columns of image data.

DETAILED DESCRIPTION

Figure 1:
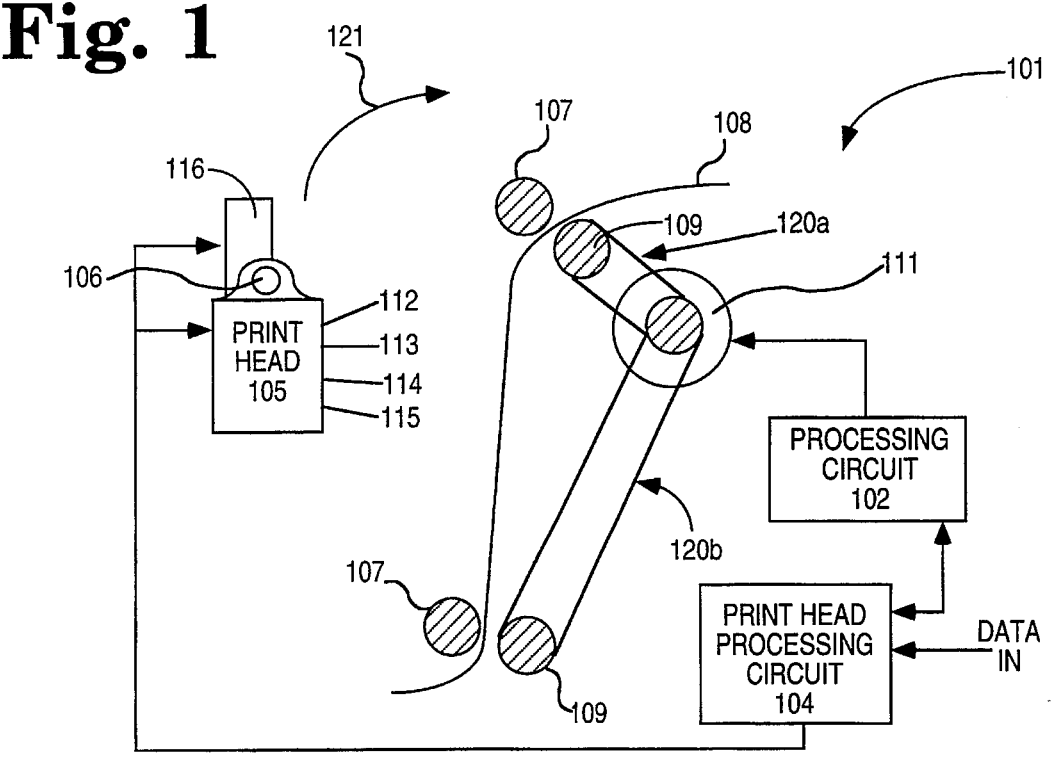
FIG. 1 is a schematic diagram of a printer assembly.

FIG. 1 illustrates in schematic form an ink jet printer assembly 101 within which the preferred embodiment of the present invention is implemented. This ink jet printer assembly 101 contains the same conventional mechanical elements as in prior art ink jet printers. In the following description numerous specific details are set forth such as dimensions, materials, layers, thicknesses, etc., in order to provide a thorough understanding of the present invention. However, it will be obvious to one skilled in the art that the invention may be practiced without these specific details. In other instances well-known processing techniques, materials, circuits, etc. have not been shown in detail in order to avoid unnecessarily obscuring the present invention. For example, the following examples will discuss the boundaries in terms of solid areas of primary and secondary colors. In actual application, each color region could be a mixture of several primary and secondary color pixels, resulting more complex boundaries.

Figure 1A:
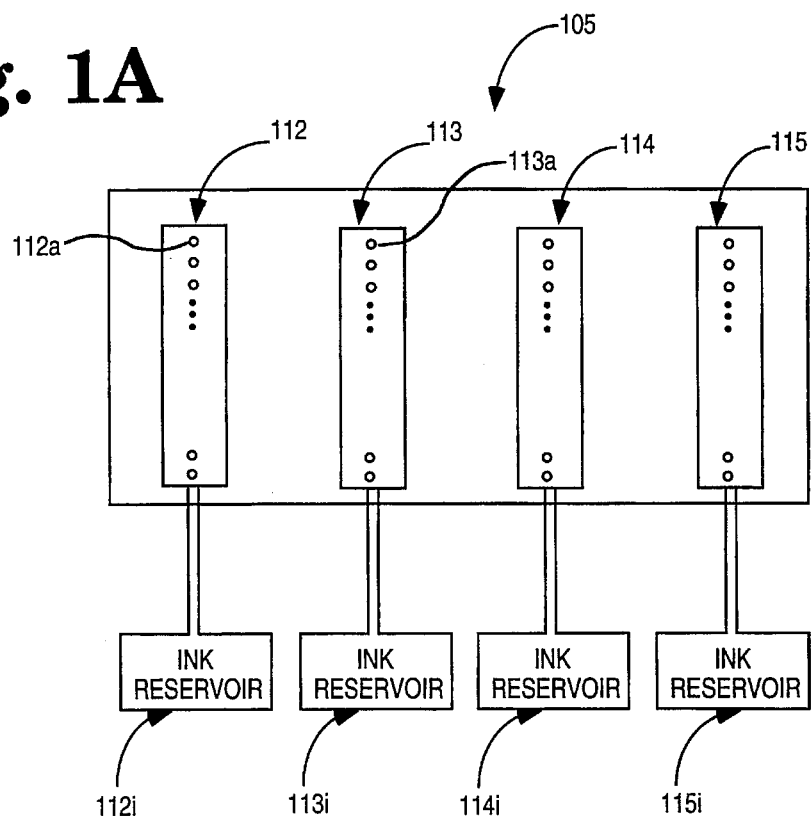
FIG. 1a shows a detailed view of the print head 105.

In FIG. 1 print head 105 is shown to be mounted on support bar 106 such that the print head may move across the printing surface. Thus, the print head may move across the print media 108 so as to print an image on the media. A conventional print head movement device such as a motor 116 coupled to a cable system may be used to move the print head. Roller 107 and roller 109 are rotated by means of drive motor 111 and cables 120a and 120b so as to propel the print media 108, typically in a vertical direction, such that the print head 105 may access the entire print media. The print media would preferably comprise a sheet of plain paper. However, coated paper could also be used. The print head typically prints what is called a scan line on each horizontal pass along the print media. The data required to make one printing pass by the print head typically defines the printed scan line. The print head 105 contains columns of nozzles 112–115. Each of these columns contains a number of openings (e.g., nozzles) for ejecting ink from the print head and the nozzles in each column are connected to the same ink reservoir. In the preferred embodiment of the present invention each column contains 64 nozzles. Typically, each column contains a different color of ink of a primary color. Nozzle column 112 may contain 64 nozzles for ejecting 64 dots of a first primary color of ink. Column 113 is shown to also contain 64 nozzles for ejecting a second primary color of ink. Nozzle column 114 is shown to contain a 64 nozzles for projecting a third primary color of ink. Similarly, nozzle column 115 may contain 64 nozzles for projecting a fourth color of ink. This fourth color is preferably a black color of ink. Printing is typically done one scan line at a time with the print head moving horizontally across the print media 108 as colors are ejected from the nozzles of 112–115. FIG. 1a shows a plan view of the print head as it appears from the printing surface of the print media. The four columns of nozzles 112, 113, 114, and 115 are arranged, as shown in FIG. 1a, in parallel on the surface of the print head which faces the print media. The nozzle 112a is the upper most nozzle in column 112 and nozzle 113a is the corresponding upper most nozzle in column 113a. The nozzles in column 112 are coupled to receive ink of a certain primary color from ink reservoir 112i, and the nozzles in column 113 are coupled to receive ink of another primary color from ink reservoir 113i. Similarly, nozzles in column 114 are coupled to receive ink from ink reservoir 114; and the nozzles in column are coupled to receive ink from ink reservoir 115i. Thus, in the case where each dot corresponds to an individual pixel, 64 pixel rows would be printed on any given scan line. Once the printing of a scan line is complete, the drive motor 111 vertically advances the paper in the conventional manner so that the printing device may print to a subsequent scan line. Arrow 121 shows the conventional direction that the paper is advanced, and the scan lines are usually perpendicular to the paper advance direction. Though the columns are shown to be straight, they may also be assigned diagonally.

Colors which are not primary colors, such as a secondary color, are typically formed by combining primary colors (e.g., combining several of the inks from the different nozzles). For example, a secondary color may be achieved by ejecting a volume of ink from one of the nozzles in column 112 (e.g., nozzle 112a) at a point on the print media and ejecting a dot of ink from the corresponding nozzle in column 113 (e.g., nozzle 113a) when that corresponding nozzle is over that point on the print media such that the two portions of ink are combined at the appropriate point on the print media 108. By using this method of printing, those colors which are not primary colors have twice as much ink on any given dot as compared to a corresponding dot of a primary color. A black color is preferably formed by depositing ink from a reservoir containing black color ink.

The processing circuit 102 controls, in the conventional manner, the movement of the drive motor 111 and interacts with the print head processing circuit 104 so as to assure that the print head accurately prints the image to each corresponding scan line before the sheet of paper is advanced, and insures that the print media is advanced the proper distance. The processing circuit 104 also controls, in the conventional manner., the movement of the print head back and forth across the sheet of paper over support bar 106. This is done by signals which are sent to the print head motor 116.

FIG. 2 shows an image formed on a sheet of paper having two colored regions of different secondary colors. Secondary color region 201 is shown to extend from line A—A to the top of the sheet. Secondary color region 202 which is a color different from the color of secondary color region 20 1 is shown to extend from line A—A to the bottom of the page. Region 203 is a portion of the printed image which lies along the boundary between secondary color region 201 and secondary color region 202.

FIG. 3 shows a magnified view of the region 203 shown in FIG. 2. That region which lies above line A—A and which has a first secondary color is designated as secondary color region 201. That portion of the printed image which lies below line A—A is designated as secondary color region 202. As in FIG. 2, secondary color region 201 is a different secondary color from the secondary color of secondary color region 202. Pixels 301–305 represent regions which contain a dot of ink having a color which is the color of secondary color region 201, and pixels 306–310 represent regions which contain a dot of ink having a color which is the color of the secondary color region 202.

Figure 4:
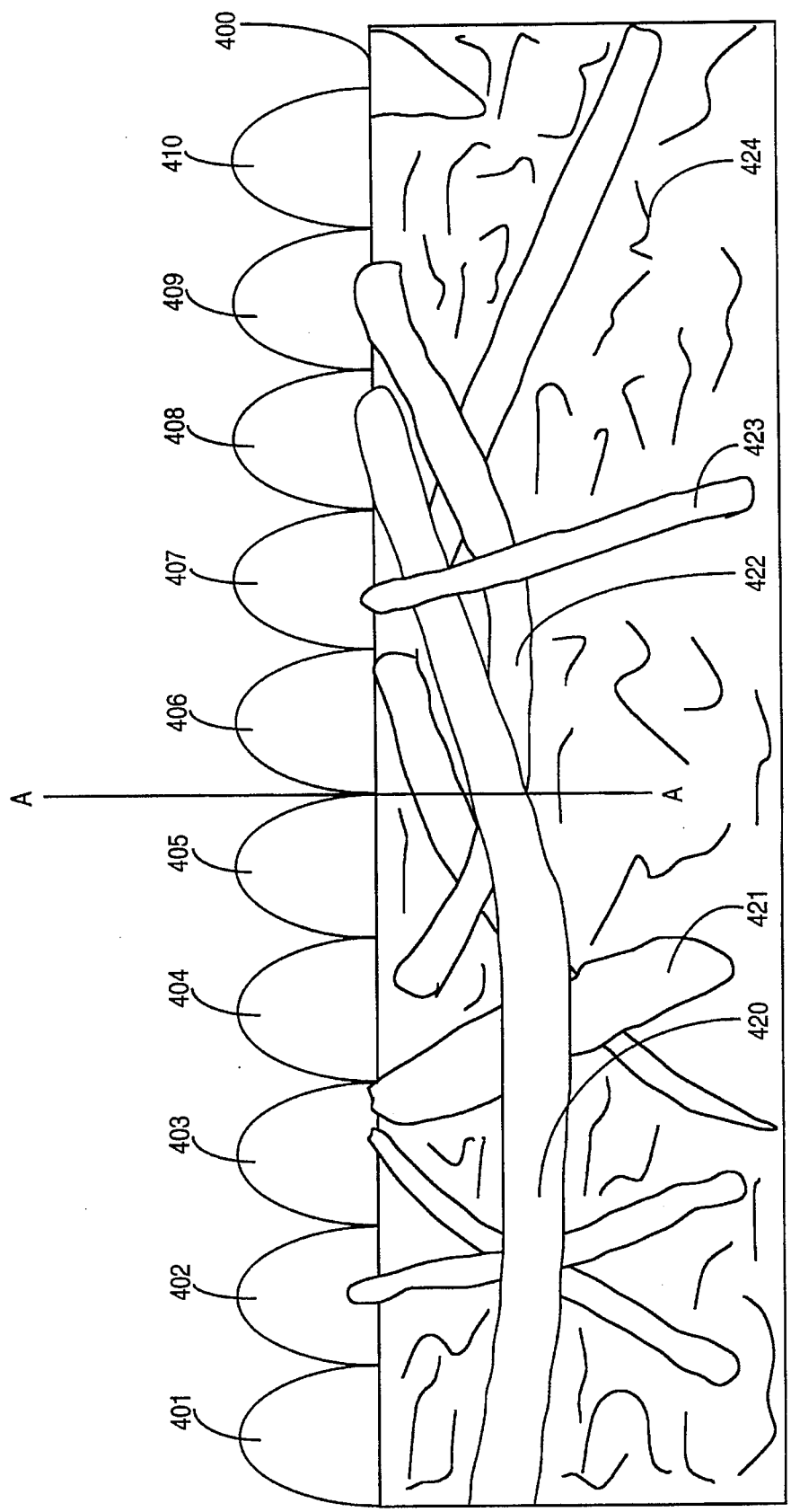
FIG. 4 is a cross-section of a portion of the printed sheet of FIG. 3 along Axis B—B.

FIG. 4 shows a cross sectional view along Axis B—B of FIG. 3. The top surface of the sheet of paper which comprises the print media is shown as surface 400. The paper itself is made up of a number of paper fibers which are pressed together. Illustrative of these fibers are paper fibers 420–424. As can be seen by this illustration, the top of the surface is not totally uniform. Upon the pass of the printer head along the surface of the sheet of paper, ink is deposited on locations corresponding to pixels 301 through 310 shown in FIG. 3. This results in ink dots 401–410. Though ink dots 401–410 are shown as discrete dots, in reality the dots flow together, splatter, and mix together. Thus, the ink from ink dots 401–405 having a first color will flow into the region containing ink dots 406–410 having a second color. Not only is their flow above the surface of the paper, but also, there is flow along the different paper fibers below the surface of the paper. For example, ink from ink dots 406–410 may flow into and through fiber 420. The amount of ink travel and the likelihood of ink flow from one colored region to another colored region has been found to be proportional to the volume of the ink at the boundary. Line A—A is illustrated in this diagram. Note that the volume of ink on each side of the boundaries on each side of the line A—A is such that flow from the region containing ink dots 401–405 into the region containing ink dots 406–410 and flow in the opposite direction could easily occur.

Figure 5:
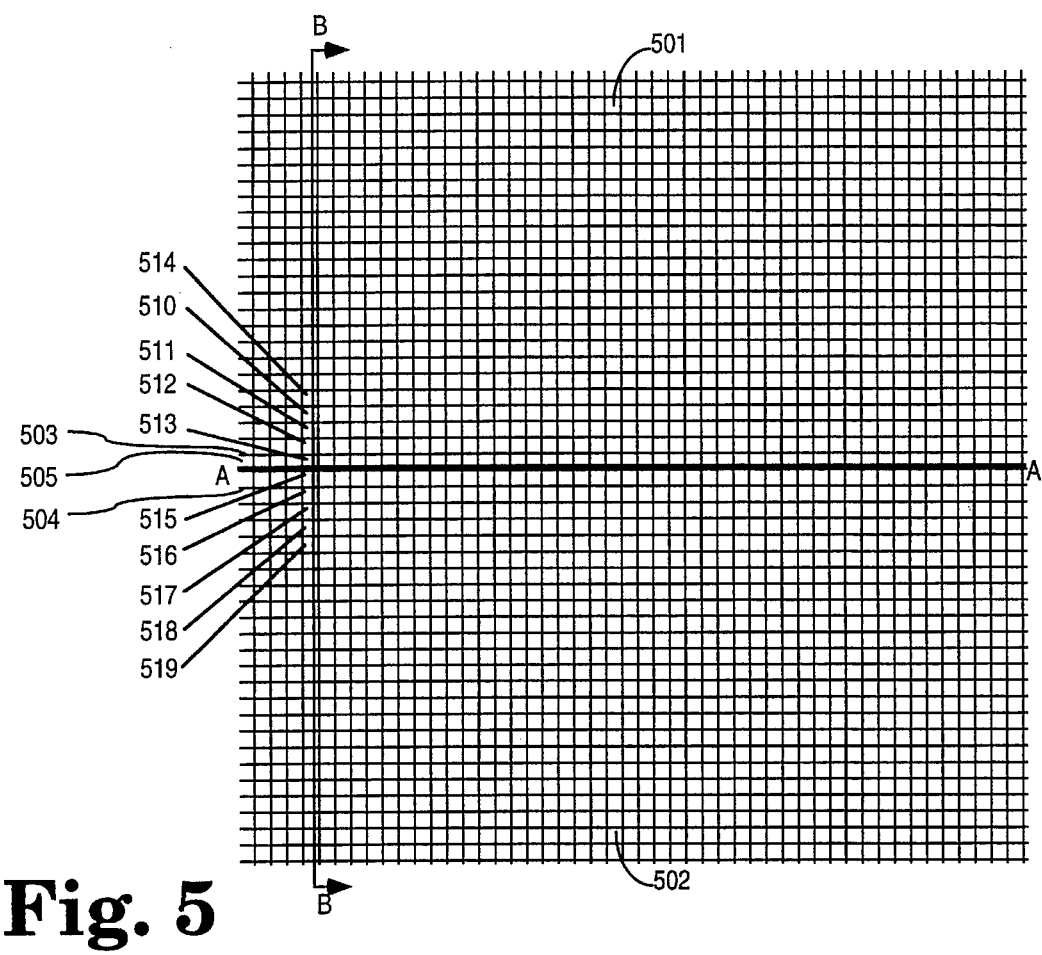
FIG. 5 is a top view of a printed sheet having a border strip formed between two regions having different secondary colors.

FIG. 5 shows an image formed, according to the present invention, on a portion of a sheet of paper wherein a reduced volume boundary region is formed for reducing the bleed between secondary color region 501 and secondary color region 502. The original line between the two secondary color regions is shown as line A—A. In this image a border strip is formed which includes those pixels which directly adjoin line A—A. This creates a border strip having a width of approximately 2 pixels. Also created is secondary color region 501 which is reduced in size approximately 1 pixel from color region 201 shown in FIGS. 2 and 3. Similarly, color region 502 is shown which is composed of a different secondary color and which corresponds to secondary color region 202 shown in FIGS. 2 and 3. Thus, the boundary within which secondary color region 501 will be printed is bounded by line 503. Similarly, secondary of color region 502 will be bounded by line 504. The region which is created between line 503 and line 504 will be referred to as border strip 505. Of course, a border strip could also be created by deleting two pixels within one of the secondary color regions. In addition, the border strip could have a width greater or less than two pixels.

In prior art processes which attempt to minimize bleed by not printing in the border strip 505, a faint white line between the secondary color region 501 and the secondary color region 502 is usually perceived by the naked eye. In the preferred embodiment of the present invention the pixels which lie within the border strip 505 contain dots of a primary color which is common to both the secondary color of secondary color region 501 and the secondary color of secondary color region 502. For example, in the situation where secondary color region 501 has a color which is green and the secondary color region 502 has a color which is red, the border strip would have a color which is yellow. This is because green is composed of cyan and yellow and red is composed of yellow and magenta. The common color is therefore yellow.

Figure 6:
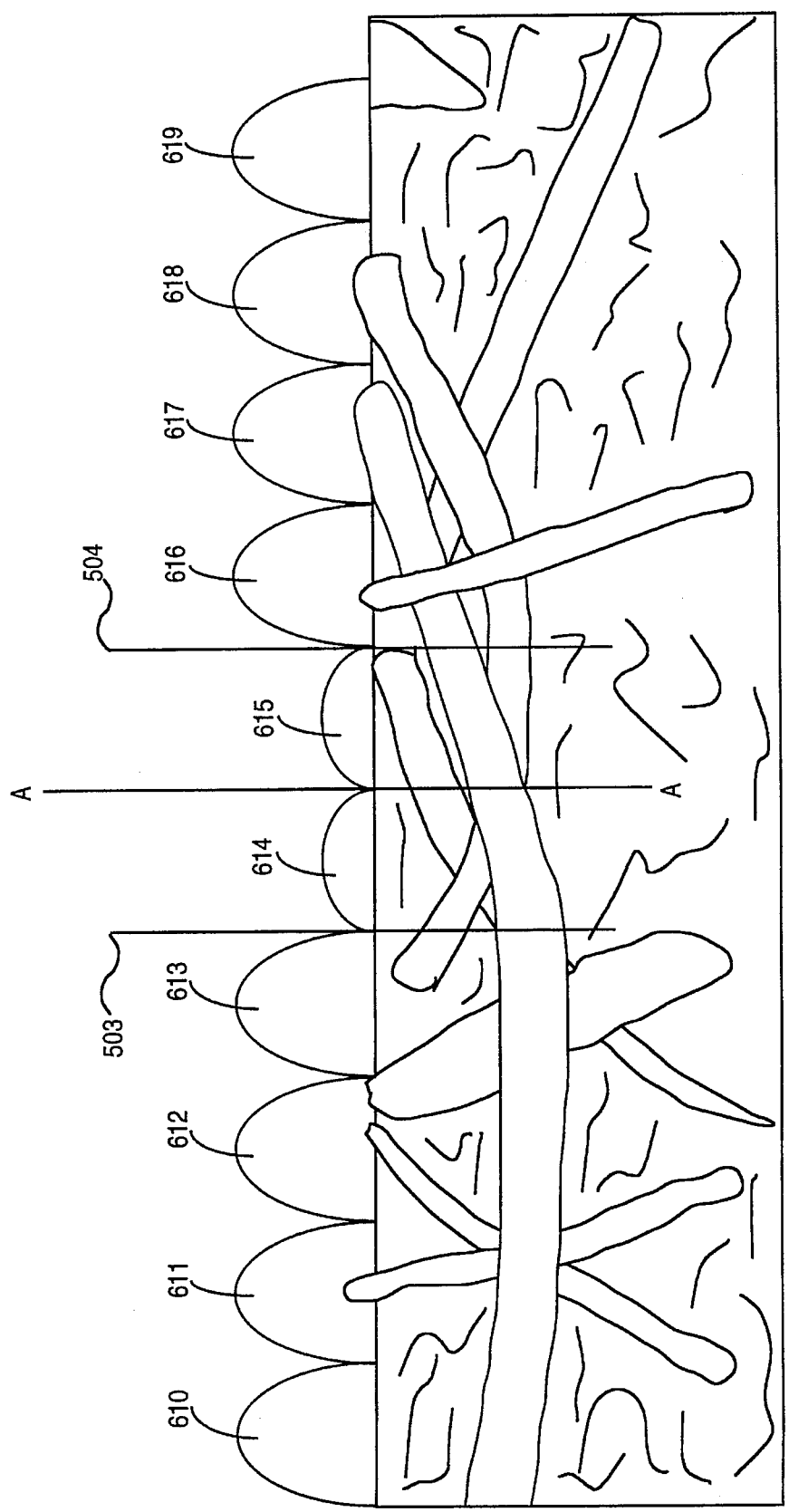
FIG. 6 is a cross sectional view of a portion of the printed sheet of FIG. 5 along Axis B—B.

FIG. 6 shows a cross sectional view along Axis B—B of the structure shown in FIG. 5. Each of the ink dots 610–613 have a color which is the color of secondary color region 501 shown in FIG. 5. Each of these dots will be formed by ejecting two volumes of ink within each dot location. For example, ink dot 610 is formed by the deposition of two portions of different primary inks, each of those portions of ink having a primary color from, for example, one of the reservoirs 112i through 114i. Ink dot 611 is also formed by the combination of two volumes of ink of a primary color. Similarly, ink dot 612 is formed by the combination of two volumes of ink, each of those volumes being of a primary color. Ink dot 612 lies within the region corresponding to region 512 of FIG. 5. Ink dot 613 is shown to correspond to region 513 of FIG. 5. In the example where secondary color region 501 has a color which is green, each of the ink dots 610–613 would have a color of green, the color being formed by the ejection of a volume of cyan ink onto each of the regions and the ejection of a volume of yellow ink onto each of the regions. Ink dot 614 and ink dot 615 lie within the border strip between lines 503 and 504. Ink dot 614 corresponds to region 514 and ink dot 615 corresponds to region 515 of FIG. 5. Ink dot 614 and ink dot 615 are shown to have a lesser height than ink dots 610–613. This is due to the fact that only one volume of ink is required to form ink dots 614 and 615. These ink dots will have ink volumes of a primary color which is common to the color of both region 501 and region 502. In the example where region 501 is a color which is green and region 502 has a color which includes yellow, each of ink dots 614 and 615 will have a color of yellow. Consequently, the volume of ink within the border strip will be less than that within the region containing dots 610–613. Ink dots 616–619 correspond to regions 516–519 shown in FIG. 5. Ink dot 616 corresponds to regions 516. Ink dot 617 is shown to correspond to region 517. Similarly, ink dot 618 corresponds to region 518, and ink dot 619 corresponds to region 519 of FIG. 5. The volume of ink formed by ink dots 616–619 is greater than that which a similar area containing a primary color would have. This can be seen by the fact that the height of ink dots 616–619 is greater than the height of ink dots 614–615.

Figure 7:
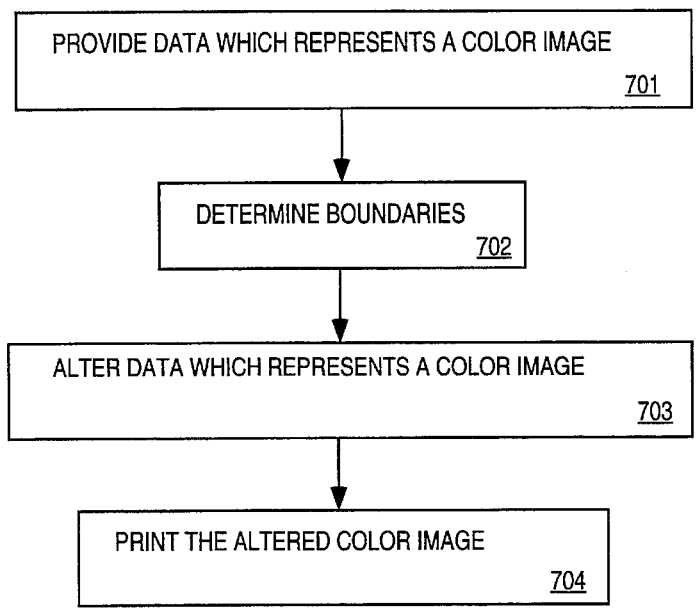
FIG. 7 is a schematic diagram illustrating the steps of the method for printing.

FIG. 7 illustrates the steps of the general method for producing a color image according to the present invention. As shown by block 701, data which represents a color image is provided to the printer. In the following example the processing of data which has already been rendered is used to illustrate the apparatus and method of the present invention which reduces the color bleed of the rendered image. However, the present invention could also be practiced before or during the rendering process. Alternatively, the present invention could be integrated into the rendering process and an image having data already modified for reduced color bleed could be sent to the printer for printing.

It will be appreciated that the image will be defined typically on a pixel by pixel basis, and each pixel will be defined by at least one primary color (usually one of the 3 inks). A secondary color for a pixel will have two multiple bit values defining the amounts of two primary colors (e.g., the amounts of 2 different inks to be combined to make the secondary color). For instance, a shade of blue may be a secondary color which is represented as having 45 unit values of cyan and 125 unit values of magenta, where the unit values are the decimal amounts of the primary color over a scale of 0 to 255 possible (this case is often referred to as "8-bit" color since 8 digital bits can define any primary color value from 0 to 255). The methods for rendering an image are well known in the art. The color image is rendered into device pixels by either the host computer or the printer controller using various halftoning techniques. During the rending process, pixels having four color components are converted to pixels having no more than two color components. The resulting image is made up of pixels at the resolution of the ink jet printer, where each of these pixels represents an individual dot of ink to be formed on the surface of the paper. Each of the pixels of the rendered image represents one of eight possible colors to be printed on the paper: cyan, magenta, yellow, red, green, blue, black, and white (where white represents the absence of ink and red, green, and blue are different combinations of cyan, magenta, and/or yellow color overlapping on one pixel). When an image is viewed from a typical viewing distance, the viewer's eye blends the colors of adjacent pixels to produce a variety of possible colors. The data representing the rendered image is stored, usually, in some memory either in the printer or the host computer to which the printer is coupled.

Next, as shown by block 702, the data is searched to determine whether boundaries exist between different regions having colors which are different secondary colors. There are a number of different edge detection algorithms which are known in the art. Any number of these prior art edge detection techniques could be used. For example, the prior art edge detection technique which is used to produce a blank line between secondary color regions may be used. However, preferably an edge detection algorithm is used which has a set of criteria such that only those junctures between pixels which meet the given criteria are considered boundaries for further processing. These criteria may include a requirement that any secondary color regions must have a depth of at least two pixels, and they must have a length of at least two pixels in order for the pixels to be considered a boundary. These minimum criteria may vary depending on the image quality and speed of processing desired. Preferably, only those borders between different secondary colors in which both of the secondary colors have a width of at least four pixels and a length of four pixels are processed for bleed reduction.

In the next step, as is shown by block 703, the data which represents the color image is altered such that a border strip of a color which is common to both secondary color regions which are juxtaposed is formed within the data. This may be done, for example, by searching the data defining a boundary region to determine which primary color is common to both secondary color regions. For example, if step 702 detects there is an edge defined by two different secondary colors, then this edge is examined to determine the common primary color. It will be appreciated that each pixel (picture element) may be a dot of ink from a nozzle or may be a plurality of dots from a plurality of nozzles. In either case, the image to be printed will be defined typically on a pixel by pixel basis, and each pixel will be defined by at least one primary color (usually one of the 3 inks). A secondary color for a pixel will have two multiple bit values defining two primary colors (e.g., the 2 different inks to be combined to make the secondary color). For instance, a shade of blue may be a secondary color which is represented as having cyan and magenta, The method in step 703 examines the primary colors making up the secondary color for at least one pixel in the one secondary color region and for at least one pixel in the other secondary color region, and then the method determines which primary color is common between the two adjoining secondary color regions by comparing the values of the primary colors of the two different pixels from the two different secondary color regions. The data bits which represent this common color are then altered so as to delete the color which is not the common color from each of the pixels which lie within the search area and which lie on each side of the border. Further areas requiring bleed reduction are processed according to step 703 after edge detection until such time as the entire data which represents the color image has been searched and altered as necessary.

The print head processing circuit 104 may be used to perform this search using known microcontrollers or microprocessors to execute the method described here. However, a program located within the software of the host computer, to which the printer is coupled, may also be used to perform steps 702 and 703 by searching on the data which represents the entire image before the image is sent to the printer. In the situation where the processing is performed by the processing circuits of the printer itself, the search is preferably performed on each unit of data as that data is sent to the printer from the computer.

Next, the color image is printed such that a border strip with a color which is of a color common to both adjoining secondary color regions is printed between the two secondary color regions. This step is illustrated by step 704 of FIG. 7. Since the strip has a color which is common to both of the secondary color regions, there is little contrast between the color of the border strip and each of the different secondary color regions. Therefore, the color of the border strip region cannot be detected by the naked eye. Much of this is due to the fact that the color which is common is used, and that the contrast between the three color regions is minimized.

Figure 8A:
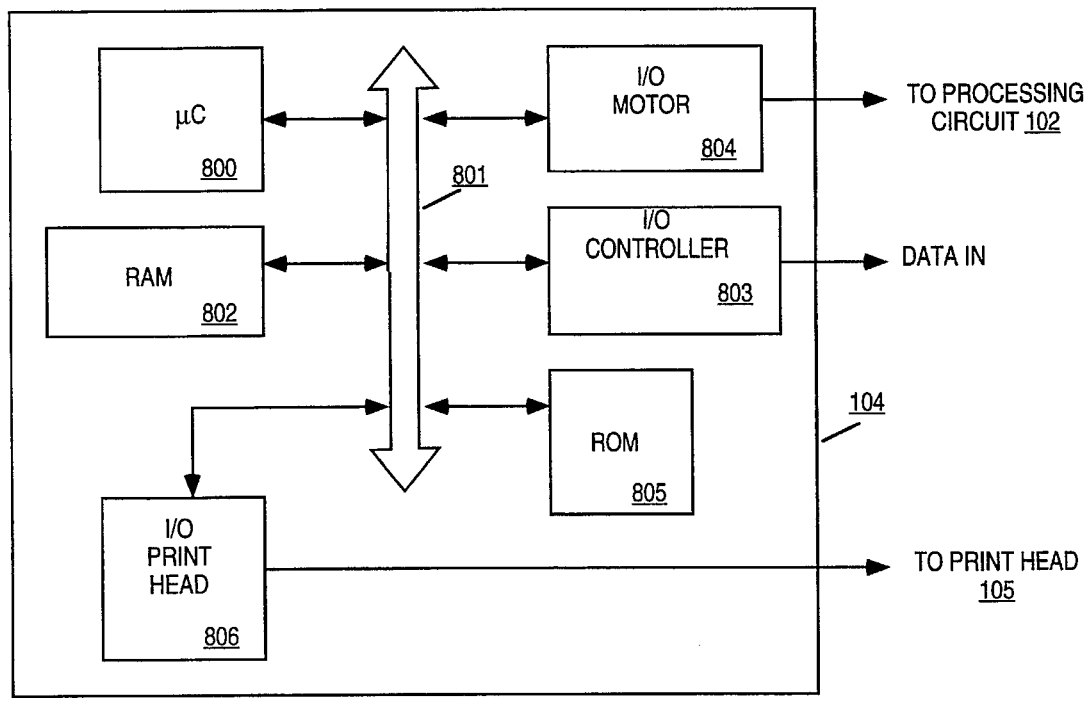
FIG. 8a shows a typical embodiment of logic for performing the method of the present invention.
Figure 8B:
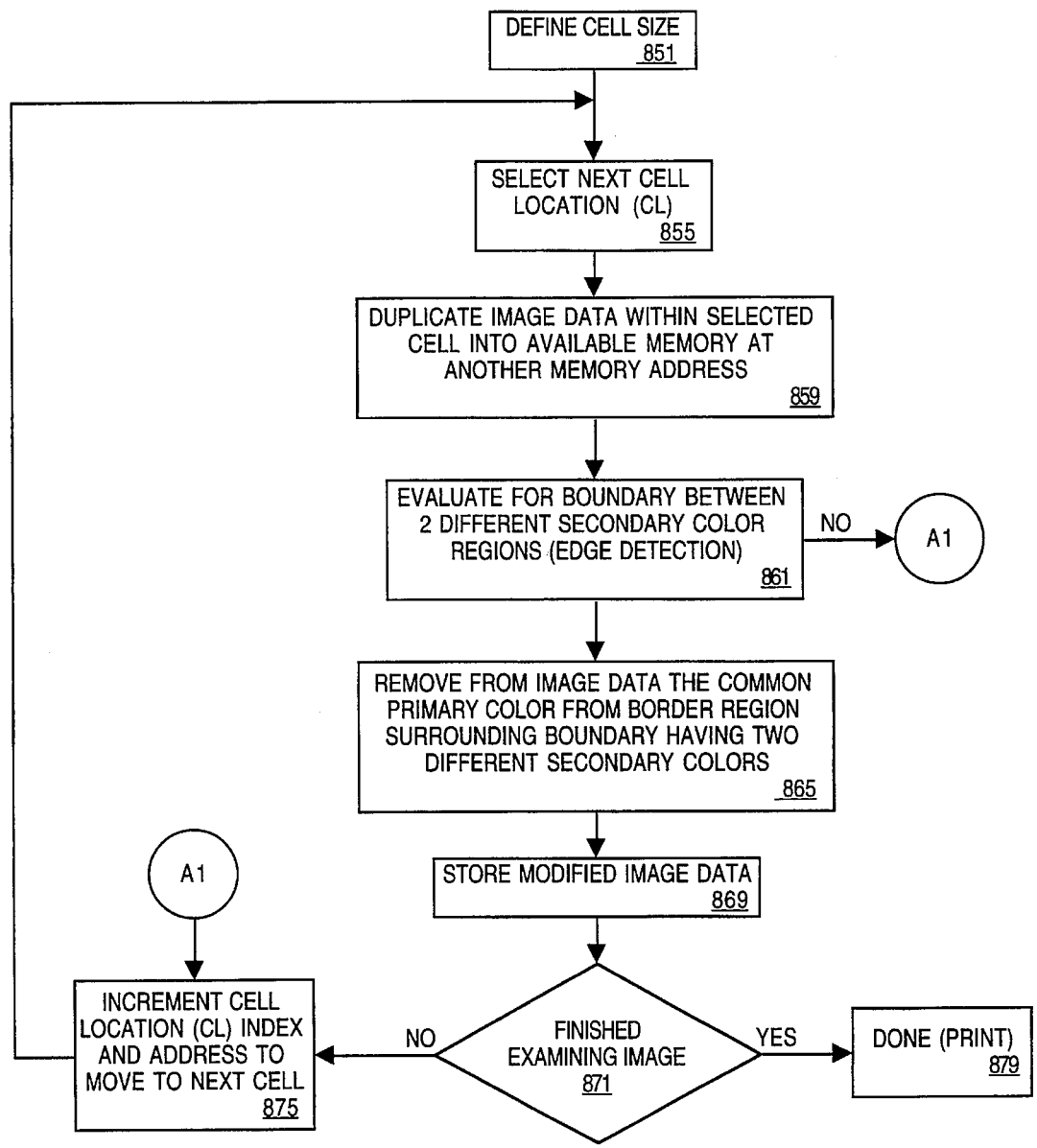
FIG. 8b is a flowchart showing a method of the present invention.

FIGS. 8a and 8b show in more detail a particular apparatus and method according to the present invention. FIG. 8a shows in more detail a particular embodiment of the print head processing circuit 104 which controls the print head and the motor for moving the paper. In a typical embodiment, the print head processing circuit 104 includes a microcontroller 800 coupled via a bus 801 to a RAM 802 and, in certain embodiments, a ROM 805, and several input/output (I/O) controllers which couple the print head processing circuit to the print head 105 and to the processing circuit 102; I/O controller 803 allows the processing circuit 104 to receive data from the host computer which is supplying data to be printed. These input/output controllers include controller 806 for coupling data and control signals from the processing circuit 104 to the print head 105. The input/output controller 803 couples the processing circuit 104 to the host computer so that data can be received from the host computer and so that control signals can be exchanged between the printer and the host computer. An input/output controller 804 couples control signals from the processing circuit 104 to the processing circuit 102 to control the motor which moves paper up and down in the printer.

In a typical operation of this printer, image data will be received from the host computer and transferred by the input/output controller 803 via the bus 801 into RAM 802. A microcontroller 800 will then evaluate this image data in RAM 802 by retrieving it and performing edge detection algorithms and color removal techniques according to the present invention and then by storing this information back into RAM 802 or into other memory locations or by sending the data directly to the print head after it has been modified according to the present invention.

FIG. 8b shows in more detail a particular embodiment of the present invention. The method shown in FIG. 8b begins at step 851 wherein a cell size is defined. The cell size specifies a portion of the image data which will be examined to determine edges in any direction where 2 different secondary color regions exist with a boundary between the two regions. This portion of the image data is often a rectangular array taken from the image data. Typically, a plurality of such rectangular arrays will be sequentially taken from the image data such that the total number of the arrays will cover the entire image data. Typically, each successive array will overlap with the prior, except in the instance of first cell, which might be in the upper left hand corner of the image data. It will be appreciated that selecting a larger cell size will mean that fewer cells need to be considered in order to evaluate a single image. In step 855 a cell location is selected for the operation according to the present invention. According to this particular embodiment, the image data within the selected cell is copied into available memory (e.g., RAM) at another memory address in order not to disturb the original image data. Then, in step 861 a processor, such as the microcontroller 800 operating under program instructions stored in the system such as ROM 805, examines for boundaries between 2 different secondary color regions. As noted above, this is typically performed by traditional and well known edge detection algorithms. If no boundaries between 2 different secondary color regions are discovered then processing proceeds through node A1 to step 875. If the processor discovers that a boundary does exist between 2 different secondary color regions then processing proceeds to step 865 in which the processor removes from the image data stored in step 859 the common primary color from the border region (such as, for example, border strip 505 shown in FIG. 5) surrounding the boundary having the 2 different secondary colors. Next, in step 869 the modified image data is stored. This is typically done by storing the modified image data in another memory address which is different from the memory addresses stored for the selected cell in step 859. This is done in order to collect up a sequence of cells containing modified image data such that the cells that have been modified can be saved back into the original image data when the modified image data will not effect future edge detection. Thus, for example, if 3 rows of modified cells containing modified image data have been saved in one memory location then the first of those 3 rows may be saved back into the original image data since in a typical embodiment only the first 2 rows will overlap each other and the third row will not overlap with the first row. That is, once processing of the third row of cells is completed no further modification of cells in the first row will be necessary.

Figure 9:
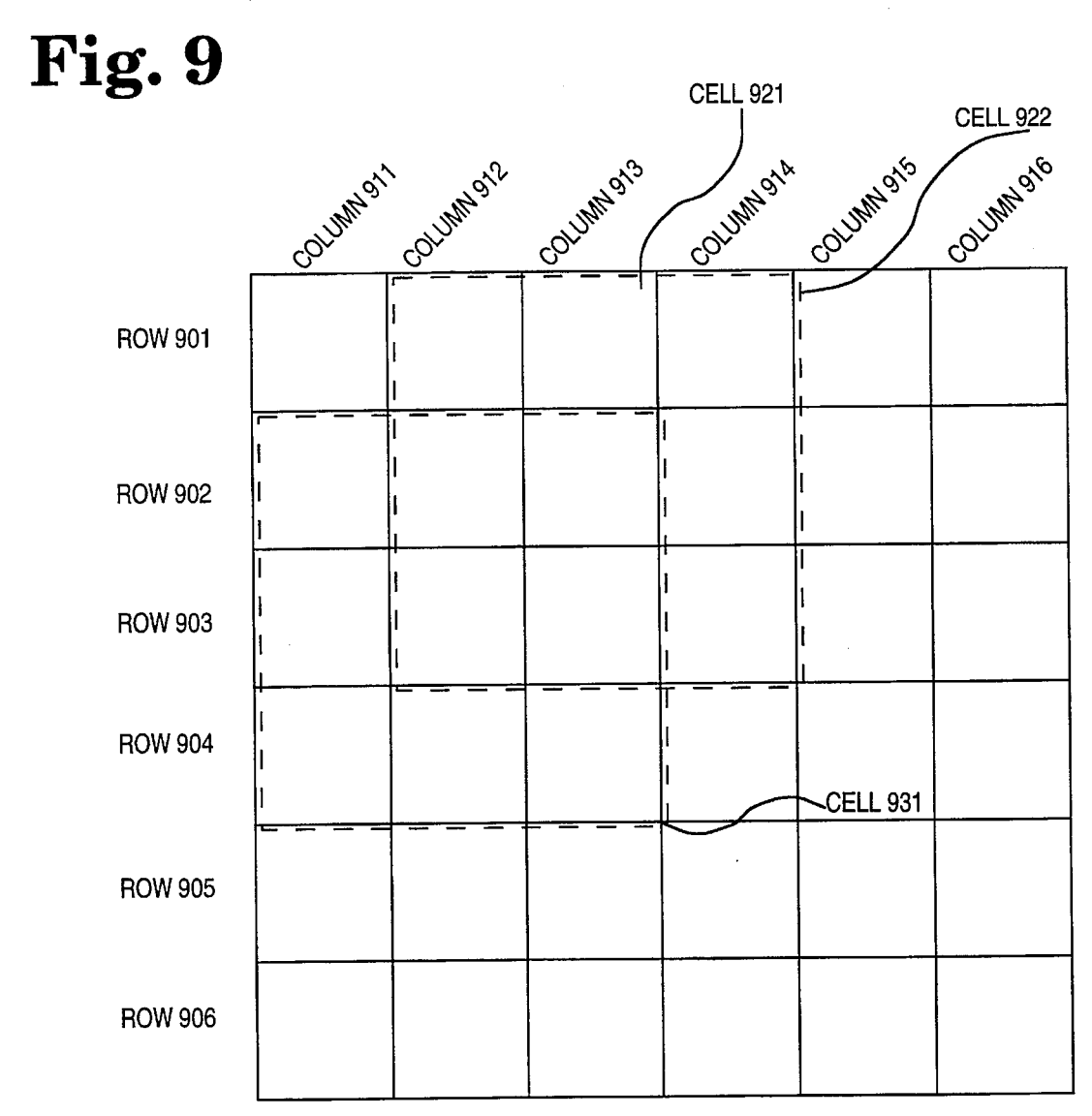

This can be seen from FIG. 9. FIG. 9 shows rows of pixels 901–906, each of those pixels having a color. Each of the pixels also lies within one of the columns 911–916. In this example, the cell 921 is shown to include those data bits which lie within row 901 through 903 and within column 911 through 913. For example, this would include data bits defining pixels having row and column coordinates 901, 911, and 901, 912 and 901, 913, and 902, 911 and 902, 912 and 902, 913 and 903, 911, and 903, 912 and 903, 913. A second cell 922 is shown to include those data bits which represent pixels which lie within rows 901–903 and columns 912–914. For example, this cell would include data bits defining pixels having row and column coordinates 901, 912, and 901, 913, and 901, 914, and 902, 912, and 902, 913, and 902, 914, and 903, 912, and 903, 913, and 903, 914. A third cell, cell 931 is shown to overlap cell 921 and cell 922. Cell 931 includes those data bits which representing pixels within rows 902–904 and columns 911 through 913. In this example, it would include those pixels having row, column coordinates 902, 911 and 902, 912, and 902, 913, and 903, 911, and 903, 912, and 903, 913, and 904, 911, and 904, 912, and 904, 913.

In the example where cell 921 is processed first, and cell 922 is processed second, it can be seen that those data bits which lie within row 901 and exclusively within cell 921 may be saved back into the image data after the processing of cell 921. This is because cell 922 would not include data from those data bits which lie within column 911 and because cell 931 would not include data from those data bits which represent pixels which lie within row 901.

After the modified image data has been stored for the current cell being processed, the method proceeds to step 871 in which it examines whether all the image data has been processed according to the present invention. If all the image data has been processed then processing proceeds to step 879 which may include the step of printing the image according to the present invention. The test in step 871 may involve examining the current value of the cell location index (CL) and comparing it to the maximum value of the cell location index given the cell size which has been defined in step 851. If the image data has not been completely examined for edge detection and primary color removal as determined by step 871 then processing proceeds to step 875 in which the cell location index value is incremented and the memory addresses incremented to move to the next cell. As described above, the address for the image data will be incremented such that the next cell will overlap to some extent with the prior cell. After step 875, the invention proceeds to step 855 and continues through the process described above.

The present invention has been described with particular reference to a color ink jet printer. It will be appreciated that the method of the present invention may also be performed on a non scanning head printer as well as pen plotters and color laser printers. Other modifications according to the spirit of the present invention will be appreciated by those in the art. The forgoing description and the accompanying figures are meant to illustrate the invention and should not be interpreted in a restrictive sense as it is the following claims which define the scope of the present invention.

What is claimed is:

1. A printer for printing an image having primary colors and secondary colors onto a media comprising:

a housing;

a plurality of rollers, said plurality of rollers being disposed within said housing such that each of said rollers may rotate;

a drive motor, said drive motor disposed within said housing and coupled to said plurality of rollers such that the engagement of said drive motor causes said rollers to rotate;

a plurality of ink reservoirs each of said ink reservoirs containing ink having a color;

a print head, said print head located within said housing such that said print head may move across said media, said print head having a plurality of nozzles and coupled to said plurality of ink reservoirs such that said ink may be disposed onto said media;

a drive mechanism, said drive mechanism disposed within said housing and coupled to said print head so as to move said print head across said media; and a plurality of processing circuits, said plurality of processing circuits coupled to said drive motor so as to control the engagement of said drive motor for controlling the movement of said rollers during printing, said processing circuits altering said image so as to provide an altered image, said altered image having a border strip disposed between adjoining regions of different secondary colors, said adjoining regions of different secondary colors comprising borders, wherein said border strip has a color and wherein said color of said border strip is a primary color which is common to the secondary color of each of said adjoining regions of different secondary colors, said print head processing circuits coupled to said drive mechanism and to said print head, said print head processing circuits controlling said drive mechanism and said print head so as to allow for said altered image to be printed onto said media.

2. The printer of claim 1 wherein said processing circuits perform an edge detection algorithm to determine said border strip.

3. The printer of claim 1 wherein said adjoining regions of different secondary colors comprise said border strip only when each of said adjoining regions of different secondary colors comprise a width of four or more pixels and a length of four or more pixels.

4. The printer of claim 3 wherein said border strip has a width of approximately two pixels.

5. The printer of claim 3 wherein said border strip has a width of approximately two ink dots.

6. The printer of claim 1 wherein said media comprises plain paper.

7. A method of printing an image onto a media using a color printer engine which includes processing circuits and a print head comprising:

providing data which represents an image, said image being defined by a plurality of pixels, each of said pixels having a color which is defined by a plurality of data bits, said color being either a primary color or a secondary color;

inputting at least a portion of said data which represents an image into said processing circuits;

searching said data which represents said image which is input into said processing circuit so as to determine whether said image input into said processing circuit includes data which comprises a border between a plurality of pixels having a secondary color and a plurality of adjoining pixels having a different secondary color;

if said image includes data which defines a border between a plurality of pixels having a secondary color and a plurality of adjoining pixels having a different secondary color, altering said data which represents said image so as to produce an altered image including a plurality of altered data bits, said altered data bits defining a number of altered pixels, said altered pixels having a color which is common to the color of said plurality of pixels having a secondary color and said plurality of adjoining pixels having a different secondary color; and printing said altered image.

8. A printer for printing an image having primary colors and secondary colors and adjoining regions of different secondary colors onto a media having a surface comprising:

a housing;

a plurality of ink reservoirs for storing a plurality of colors of ink;

a print means movably coupled to said housing and to said plurality of ink reservoirs such that said print means may move across said media surface;

propulsion means for moving said print means across said media surface, said propulsion means coupled to said print means and coupled to said housing such that the engagement of said propulsion means moves said print means across the surface of said media;

media propulsion means, said media propulsion means connected to said housing such that said media propulsion means may move said media past said print head such that said print head may print to said media surface;

image processing means for altering said image so as to produce an altered image, said altered image having a border strip disposed between adjoining regions of different secondary colors of said image, wherein said border strip has a color and wherein said color of said border strip is a primary color which is common to the secondary color of each of said adjoining regions of different secondary colors; and control means coupled to said propulsion means for controlling the movement of said print means across said media surface, said control means coupled to said media propulsion means for controlling the movement of said media and coupled to said print head so as to control the printing of said altered image onto said media surface.

9. The printer of claim 8 wherein said image is comprised of a number of pixels, and wherein each of said pixels is defined by a number of data bits and wherein said image processing means performs an edge detection algorithm on said data bits which define said image.

10. The printer of claim 9 wherein said image processing means further comprises means for altering data bits, said means for altering data bits being responsive to said edge detection algorithm such that upon the detection of a border between said adjoining regions of different secondary colors by said edge detection algorithm, said bits which define said image are altered so as to produce said border strip.

11. The printer of claim 8 wherein said border strip has a width of approximately two ink dots.

12. The printer of claim 8 wherein said printer comprises an ink jet printer and wherein said media comprises plain paper.

13. The printer of claim 8 wherein said border strip has a width of approximately two pixels.

14. A method of printing comprising the steps of:

providing an image wherein said image may have adjoining regions of color and wherein said adjoining regions of color may have colors which are different secondary colors, wherein said image provided is composed of a number of pixels, and wherein each of said pixels has a color, the color of each of said pixels being defined by a plurality of data bits;

altering said image when said image includes adjoining regions of different secondary colors so as to produce an altered image, wherein altering said image includes performing an edge detection algorithm on said plurality of data bits so as to determine whether said adjoining regions of different secondary colors define a border, said altered image having a border strip disposed between said adjoining regions of different secondary colors, said border strip having pixels, each of said pixels within said border strip having an altered color, said altered color being a primary color which is common to the colors of each of said adjoining regions of different secondary colors; and printing said altered image.

15. The method of printing of claim 14 wherein said altered image is printed on plain paper.

16. The method of claim 14 wherein said border strip of said altered image has a width and a length, and wherein said width is approximately two pixels and said length is greater than or equal to approximately two pixels.

17. The method of printing of claim 14 wherein said step of printing said altered image produces a printed image, and wherein said printed image includes a printed border strip having a width of approximately two dots of ink.

* * * * *